US012755327B2

(12) United States Patent
Goettsch et al.

(10) Patent No.: US 12,755,327 B2
(45) Date of Patent: Oct. 6, 2026

(54) LANDSCAPE MAINTENANCE AND MANAGEMENT SYSTEM

(71) Applicant: Contrack Management, LLC, Canyon Lake, TX (US)

(72) Inventors: Thadd Goettsch, Canyon Lake, TX (US); Robert E. Moon, Carrolton, TX (US)

(73) Assignee: Contrack Management, LLC, Canyon Lake, TX (US)

( * ) Notice: Subject to any disclaimer, the term of this patent is extended or adjusted under 35 U.S.C. 154(b) by 112 days.

(21) Appl. No.: 17/888,482

(22) Filed: Aug. 16, 2022

(65) Prior Publication Data

US 2023/0056157 A1 Feb. 23, 2023

Related U.S. Application Data

(60) Provisional application No. 63/235,063, filed on Aug. 19, 2021.

(51) Int. Cl.
*G06Q 30/00* (2023.01)
*G06Q 10/20* (2023.01)
(Continued)

(52) U.S. Cl.
CPC ........... *G06Q 50/163* (2013.01); *G06Q 10/20* (2013.01); *G06Q 30/0611* (2013.01); *G06Q 50/165* (2013.01); *G06Q 10/06393* (2013.01)

(58) Field of Classification Search
CPC .. G06Q 50/163; G06Q 10/20; G06Q 30/0611; G06Q 50/165; G06Q 10/06393
(Continued)

(56) References Cited

U.S. PATENT DOCUMENTS 8,204,820 B2 * 6/2012 Cullen, III ............. G06Q 10/06 705/37
11,283,872 B1 * 3/2022 Jayapalan ............ G06Q 20/405
(Continued)

OTHER PUBLICATIONS

Aspire Software: "Aspire Landscape Business Management Software: Plans," archive.org/wayback machine/youraspire.com; Jun. 14, 2021, 5pgs. (Year: 2021).*

*Primary Examiner* — Robert M Pond
(74) *Attorney, Agent, or Firm* — Denise L. Mayfield; Munck Wilson Mandala, LLP

(57) ABSTRACT

Systems and methods are provided for managing and monitoring landscape service providers, contractors, and others, for delivery of appropriate services and/or products to a subject residential or commercial property. A computer implemented electronic system having a number of modules and/or components, including a central computer portal, a secure user interface for a potential service provider (landscape service provider, contractor) in electronic communication with the central computer portal, a consumer/customer portal linked to access information concerning service provided (accessible to a property manager, property owner, residential customer) in electronic communication with a central computer portal, and an integrated network of electronic data-collecting sensors (such as at/on a subject property of interest/subject property), is provided. The systems and methods include a number of integrated modules fashioned to perform particular tasks as part of an overall property management system, including a request for qualifications (RFQ) generating module, a procurement module, a contact compliance and monitoring module, an asset management module, a water management module and a mechanical maintenance module.

18 Claims, 9 Drawing Sheets

(51) Int. Cl.

| | |
|---|---|
| ***G06Q 30/0601*** | (2023.01) |
| ***G06Q 50/16*** | (2012.01) |
| ***G06Q 50/163*** | (2024.01) |
| *G06Q 10/0639* | (2023.01) |

(58) Field of Classification Search
USPC ........................................................ 705/26, 27
See application file for complete search history.

(56) References Cited

U.S. PATENT DOCUMENTS

2015/0161695 A1* 6/2015 Koby ................. G06Q 30/0282 705/26.4
2016/0057949 A1* 3/2016 Williams ............. A01G 25/167 700/275
2017/0172077 A1* 6/2017 Wouhaybi .............. A01G 25/16
2021/0350481 A1* 11/2021 Waslander ....... G06Q 10/06313

* cited by examiner

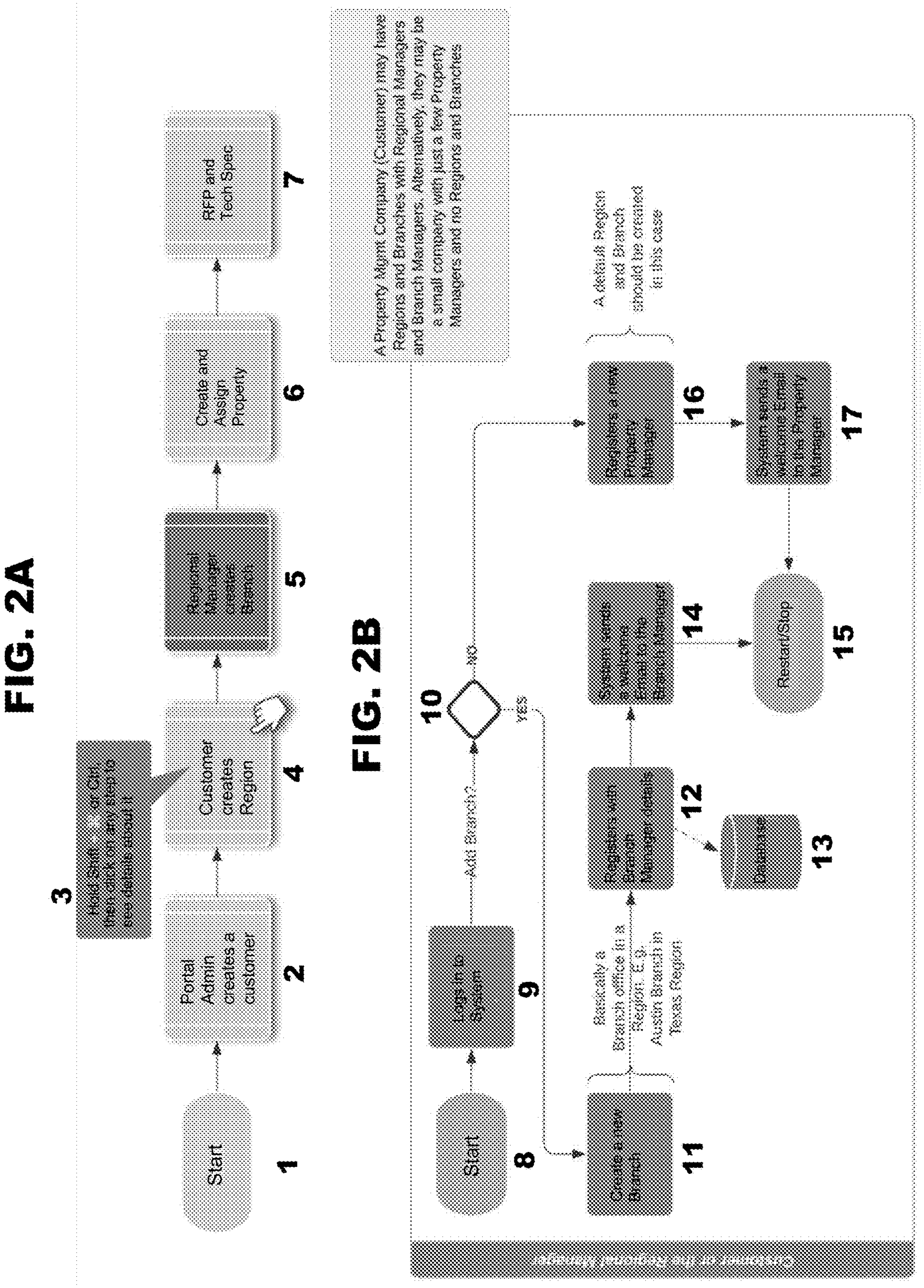
FIG. 2A
Start
1
Portal Admin creates a customer
2
Hold Shift or Ctrl then click on any step to see details about it
3
Customer creates Region
4
Regional Manager creates Branch
5
Create and Assign Property
6
RFP and Tech Spec
7
FIG. 2B
A Property Mgmt Company (Customer) may have Regions and Branches with Regional Managers and Branch Managers. Alternatively, they may be a small company with just a few Property Managers and no Regions and Branches
Start
8
Logs in to System
9
Add Branch?
10
YES
NO
Create a new Branch
11
Basically a Branch office in a Region. E.g. Austin Branch in Texas Region
Registers with Branch Manager details
12
Database
13
System sends a welcome Email to the Branch Manager
14
Restart/Stop
15
Registers a new Property Manager
16
A default Region and Branch should be created in this case
System sends a welcome Email to the Property Manager
17

RFP and Tech Spec
Award Contract
Execute Work Orders

Start
Negotiate?
Yes
No
Award the contract to Vendor

Logs In
Plan ok?
Edit the Plan
Yes
No
Add Crew Leader?
End
A
B

LANDSCAPE MAINTENANCE AND MANAGEMENT SYSTEM

RELATED APPLICATIONS

The present application is a U.S. Non-Provisional patent application, which claims priority to U.S. Provisional Patent Application No. 63/235,063, which is incorporated herein in its entirety.

BACKGROUND

Professional landscape and maintenance service providers/contractors handle a number of logistical and quality control challenges that complicate and render it difficult to provide reliable and comprehensive services in a readily defined product to a consumer/customer, particularly a commercial consumer/customer managing large and/or intricately designed property grounds. Typically, conventional service agreements, work orders, and work projects are not easily understood by the consumer/customer, owing at least in part to limited knowledge, understanding, and lack of customer experience working with a landscape and/or grounds service provider. The consumer/customer is also not provided with the necessary tools needed to effectively monitor the amount and quality of services being delivered by a contractor/landscape service provider, oftentimes resulting in services not being delivered as contracted and overcharges to the consumer. Schedules and types of fertilizer applications delivered, accuracy of HVAC and other technician services time rendered, pool service cleaning services performed, among other things, are not effectively tracked under current conventional practices in the industry. As a result, consumers, customers, property managers, and property owners are routinely erroneously charged for services that were not performed and/or product that was not delivered to a subject property. The resulting excessive cost, inferior and/or inadequate grounds maintenance, and customer dissatisfaction, evidences a tremendous unmet need in the industry for methods and systems that ensure better quality control and accountability. Systems/methods are needed that provide the customer with a tool for monitoring, tracking, and quantifying contractor/landscape grounds service provider quality of performance and costs.

The above and other problems in the landscape maintenance and grounds keeping art are solved with the presently disclosed methods and systems.

SUMMARY OF THE INVENTION

The present methods and systems provide a solution to the above and other long-felt unmet needs of the consumer/customer and property manager.

In a general and overall sense, the presently disclosed systems and methods provide a tool for the consumer/property manager for selecting an appropriate landscape services provider, as well as a tool for the consumer/property manager to effectively monitor, track, and verify delivery of goods and services by a landscape service provider/contractor to a subject property. This consumer tool also provides a system by which the consumer may quantify and evaluate the services and goods of a landscape and/or other grounds related service provider at a subject property.

In one embodiment, a property management system that comprises a software implemented system having a central control unit is provided. This software implemented system is more fully described as an automated system, and is designed to provide an automated system employing electronic means by which a consumer and/or property manager may monitor the condition of a subject property, and manage/monitor the performance/delivery of goods/services by a landscape service provider at a subject property.

In one aspect, the automated system is described as an electronically interconnected system having a secure central portal though which a potential consumer/customer/property manager (though a secure customer portal) and a potential landscape service provider/contractor (through a secure landscape service provider/contractor portal) are able to communicate.

As part of the described system, an electronic means may be provided at a subject property that electronically collects and transmits information/data concerning the subject property to a secure central computer portal, and from the central computer portal to a secure consumer/customer/property manager portal. This information/data may include, for example, the water level, temperature, humidity, or other conditions at a subject property. By way of example, the electronic means at the subject property that collects and transmits information/data may comprise a receiving unit (such as a sensor).

The sensor unit on/at a subject property may be designed to provide a continuous stream of information to a consumer and/or property manager of selected property metrics of interest. These metrics of interest would be useful to the consumer and/or property manager in monitoring the condition of the subject property and permitting the consumer/customer to electronically direct implementation of necessary/appropriate corrective action to prevent damage/harm to a subject property. The sensor mechanism may also provide a means by which the consumer/customer may obtain information useful in the monitoring the effectiveness of any services or maintenance program being provided at the subject property. Such data/information may also include, for example, water/moisture level monitoring (as part of a water management module), plant/shrub condition monitoring (as part of an asset management module), and/or irrigation/mechanical systems activity/status condition monitoring (as part of a forecasting module).

In particular embodiments, the system comprises an electronic means suitable for the landscape service provider/property manager to securely enter service data/information into a secure service provider portal of the system, the service data/information then being transmitted to the customer/consumer through the central portal of the system, and then to the consumer/customer portal. The data/information may then be stored securely at the consumer/customer portal, and monitored to assess compliance of the landscape service provider with defined tasks (as part of contract performance compliance module).

In a further aspect, the tool/system/method includes an electronic means by which the consumer/customer/property manager may use the secure customer portal to remotely and continuously monitor the subject property for possible security breaches, such as from entry on the subject property by unauthorized parties. This component may further include an alarm functionality, as well as a means to alert local security personnel to take corrective/protective action (as part of a security module).

The interactive electronic systems/modules of the present systems and methods permit the consumer/customer to securely monitor activity and/or conditions at a subject property through a customer/consumer secure portal. The automated system may include a feature permitting the landscape or other service provider to enter data though a service provider portal of the system, that the service provider can employ to document and validate delivery of a particular task, service or product to a subject property. The service provider portal will include an electronic means by which the service provider may electronically log-in to the system at a subject property, and enter data documenting delivery (date/time) of a specific service and/or product (e.g., fertilizer) to the subject property. This data is then securely communicated electronically to the central portal of the system, and is then transmitted from the central portal to the consumer/customer portal. In addition, the specific "log-in" feature of the service provider portal provides an enhanced security feature to the system, and prevents unauthorized/unregistered landscape service providers/others from accessing a subject property.

The method and/or system may also include a means for the consumer/customer/property manager to access remote surveillance of the subject property. In yet another aspect, the method and/or system may include a monitoring means that will electronically record and document any failure to deliver a scheduled service and/or product to a subject property, and also to alert the consumer/property manager of the need for a particular service and/or product to be provided. This feature will serve to prevent loss and/or contain damage at a subject property in the event a landscape service provider/contractor does not provide services/goods as requested.

In another general and overall sense, a method and/or system for creating a geographically suitable landscaping plan for a subject property is provided. In some aspects, the geographically suitable landscaping plan for a subject property will include identification of selected plant types, trees and other vegetation that are suitable for a specific climate, soil type, etc., of the geographical region in which the subject property is located. In one embodiment, identification of an appropriate pest-control regimen according to the geographical location of the subject property is also provided.

Advantages of the systems and methods disclosed include at least the following:

Accountability
Transparency
Integrity
Objectivity
Data capture and compilation

The platform provided in the product system provides a consumer/property manager with a step-by-step guide for creating a tailored and comprehensive maintenance/service system for a subject property that is efficient and effective to assure improved execution of maintenance contract responsibilities by a service provider, beginning at inception of a contract (start date) to the termination date of the contract. The system is also designed to generate a report for the customer/property manager. A computer generated and/or electronically generated report provides a user and/or service provider or property manager, an accurate and tabulated record of all services rendered and products delivered, among other metrics and other data, for a specific subject property, and a computer software system may be developed to provide a computer implemented program that, when executed and/or implemented by the computer, will provide for the generation of a periodic report that is specific for a part or an entire contract term. This generated report may be provided as an electronic image at a designated user interface (such as a computer screen), and/or may be provided as a printed paper report. In either or both forms, the report provides a tool for the consumer/property manager, and may be used to assess compliance with the performance terms of a commercial and/or residential property contract at any set interval during the contract term, as well as at the end of a contract term. The report may also be used as a quality control tool, such as to adjust any payment amounts to be paid or that have already been paid by the consumer/customer, so as to conform and/or accurately correlate with the actual services performed/rendered by the landscape provider/contractor.

The systems and methods presented are implemented into an electronically implemented tool that may be used for both commercial property maintenance and residential property maintenance. Such may take the form of a computer implemented application (an "app"), that may be downloaded onto an electronic device (for example, an iphone), of a consumer recipient of property services, and/or on an electronic device of the property service provider. The systems and methods also provide for tracking the progress of landscape enhancement projects, irrigation repairs, new construction, chemical applications, tree pruning and removals, as well as many other specialty services that may be desired and/or necessary at a site.

The present systems and methods may also be adapted to provide management and monitoring of the delivery of janitorial, HVAC, plumbing, electrical, painting, roofing, and general contracting services, to verify employee compliance with service performance requirements of the landscape area contractor.

BRIEF DESCRIPTION OF THE FIGURES

FIG. 1A—Flow-chart demonstrating the system component associated with initial intake by a landscape professional company and/or service provider of a new customer. The system steps permit the landscape professional to gather and store important identifying information about the customer, and to collect specific customer requirements for a subject property. Upon registration of the customer in the system of the landscape professional, the customer is provided a secure log-in portal to the system that permits the customer to communicate with the landscape professional and/or service provider. The customer may provide information concerning a subject property or properties though this secure portal, such as information concerning specific tasks and/or materials required for servicing the customer's subject property. The customer may transmit a request to the landscape professional and/or service provider to provide a bid and/or estimate of cost for performance of the customer's requirements at the subject property, as part of a request for proposal (RFP) to provide the specified services. The system will then communicate the customer information concerning the customer's RFP for the subject property to the landscape professional and/or service provider. The landscape professional and/or service provider may then study the RFP, and prepare a Response to the RFP. This Response will constitute a bid by the landscape provider and/or service provider to the customer for the performance and/or delivery of the specified services according to the requirements of the customer. This bid and/or proposal may then be transmitted to the potential customer through the customer portal in a secure and confidential manner. The customer may access the bid and/or proposal through the customer's secure portal. The potential customer may then accept, reject, or requests modifications/additions to the landscape professional bid. The potential customer may then present the landscape professional with a contract for performance of the services agreed upon for the subject property. The landscape service provider may then accept or reject the contract, and communicate the acceptance or rejection through the portal to the potential customer. If the landscape provider accepts the contract (by providing an electronic signature to the customer), the potential customer will issue an award notification associated with the bid made to the landscape provider/professional. FIG. 1A: (1) Start. (2) Portal Admin creates a Customer. (3) Then click on any step to see details about it. (4) Customer creates Region. (5) Regional Manager creates Branch. (6) Create and Assign Property. (7) RFP and Tech Spec. FIG. 1B: (8) Start. (9) Logs into System. (10) Login successful? {Yes/No}. (11) Create a new Customer. (12) Register with Customer Details {Customer Contact Info, Email and Phone # etc.}. (13) System sends a welcome email to the Customer. (14) Log out. (15) Restart/Stop. (16) My SQL.

FIG. 2A-FIG. 2B; FIG. 2A: (1) Start. (2) Portal Admin creates a customer. (3) Hold Shift+⌘ or Ctrl, then click on any step to see details about it. (4) Customer creates Region. (5) Regional Manager creates Branch. (6) Create and Assign Property. (7) RFP and Tech Spec. FIG. 2B: (8) Start. (9) Logs into System. (10) Add Branch? {Yes/No}. (11) Create a new Branch {Basically a Branch office in a Region. E.g. Austin Branch in Texas Region}. (12) Registers with Branch Manager details. (13) Database. (14) System sends a welcome Email to the Branch Manager. (15) Restart/Stop. (16) Registers a new Property Manager {a default Region and Branch should be created in this case}. (17) System sends a welcome Email to the Property Manager.

FIG. 3A: (1) RFP and Tech Spec. (2) Award Contract. (3) Execute Work Orders. FIG. 3B: (4) Start. (5) Reviews Bid From Vendors {PM can do side by side comparison (optionally)}. (6) Negotiate? {Yes/No}. (7) Negotiates offline with a chosen vendor {PM may make changes to frequencies of certain services to adjust the bid within budget}. (8) Award the contract to Vendor. (9) Vendor notified of the contract. FIG. 3C: (10) A. (11) Gets notification of the awarded contact. (12) Logs in. (13) Creates the annual plan for the services {For each service vendor plans out when the service will be performed}. (15) {Plan ok?}. (16) Edit the Plan. (17) {Yes/No}. (18) Generate the tasks for the whole year. (19) B. (20) Groups some tasks together into a Work Order. (21) Add Crew Leader? {Yes/No}. (22) Adds a Crew Leader. (23) Assigns the WO to a Crew Leader. (24) Saves the Work Order. (25) End.

FIG. 5A: (1) Start. (2) Portal Admin creates a Customer. (3) Hold Shift+⌘ or Ctrl, then click on any step to see details about it. (4) Customer Creates Region. (5) Regional Manager creates Branch. (6) Create and Assign Property. (7) RFP and Tech Spec. FIG. 5B: (8) Start. (9) Logs into System. (10) {Add Region? Yes/No}. (11) Create a new Region {Basically a Regional Office., E.g. Texas Region}. (9) Registers with Regional Manager details. (11) Database. (12) System sends a welcome Email to the Regional Manager. (13) Restart/Stop. (14) Registers a new Property Manager {A default Region and Branch should be created in this case}. (15) System sends a welcome Email to the Property Manager.

FIG. 6A: (1) RFP and Tech Spec. (2) Award Contract. (3) Execute Work Order. (4) Perform QSI. FIG. 6B: (5) Start. (6) Vendor Logs in to the Mobile App. (7) The App shows the Work Order scheduled for the week. (8) Vendor arrives at the site and clocks in. (9) Takes any pictures prior to beginning the work. (10) Finishes the tasks in the work order. (11) A. (12) The system saves the Partially completed WO. {Finish later}. (13) Takes any Pictures after finishing the work. (14) Clocks out of the Work Order. (15) {Closes Partial WO}. (16) Vendor marks the WO as completed. (17) The system notifies the PM and the Vendor that the WO has been completed. (18) End.

FIG. 7A: (1) RFP and Tech Spec. (2) Award Contract. (3) Execute Work Orders. (4) Perform QSI. (5) End. FIG. 7B: (6) Start. (7) Property Manager begins the QSI each month. (8) The PM rates the Vendor's work for each criterion based on a 0-5 rating scale. (9) The PM may take pictures of the property along the way while recording the QSI score. (10) The system presents a Summary of the QSI score and report. (11) Publish the QSI. (12) A. (13) {Modify Score/Review not Acceptable/Review OK Acceptable}.

FIG. 8A: (1) Create and Assign Property. (2) RFP and Tech Spec. (3) Award Contract. FIG. 8B: (4) Start. (5) Reviews RFP and Tech Spec. {Needs Corrections?}. (6) {Yes}. Make Corrections to Questionnaire {Pick from an existing Vendor?}. (7) {Yes/No}. (8) Send the RFP/Tech Spec to Vendor for bidding?. (9) Enter the Vendor Details. FIG. 8C: (10) A. (11) Gets notification of the RFP. (12) Logs in. (13) Selects an RFP from a list of Pending RFPS. (14) Reviews the RFP and Tech Spec. (15) Enters the responses to each Section of the RFP (A-F). (16) B. (17) Enters General Information. (18) Enters Unit Price for each Section in the Questionnaire (Plant & Material, etc.) {Corresponding to what was identified in the questionnaire}. (19) System calculates the Annual Price for those services. (20) System calculates the Annual Price for those services. (21) Vendor provides responses to Accountability Questions. (22) C. (23) Systems determines the total Contract Value based on the Vendor's Bids. (24) System determines the monthly contract value. (25) Vendor enters the percentage increment for each year up to 5 years. (26) System determines the contract value for each of those 5 years. (27) Vendor enters bids for any extra services (landscape or irrigation). (28) Vendor enters information about the Chemical Applicators and Irrigators. (29) D. (30) Vendor enters information for Storm Damage Cleanup. (31) Vendor enters information about Heritage Tree Maintenance. (32) Vendor reviews the finished bid {Bid Ok?}. (33) {Yes/No}. (34) Vendor submits the bid. (35) B. (36) End.

DETAILED DESCRIPTION OF THE PREFERRED EMBODIMENTS

Figure 1A:
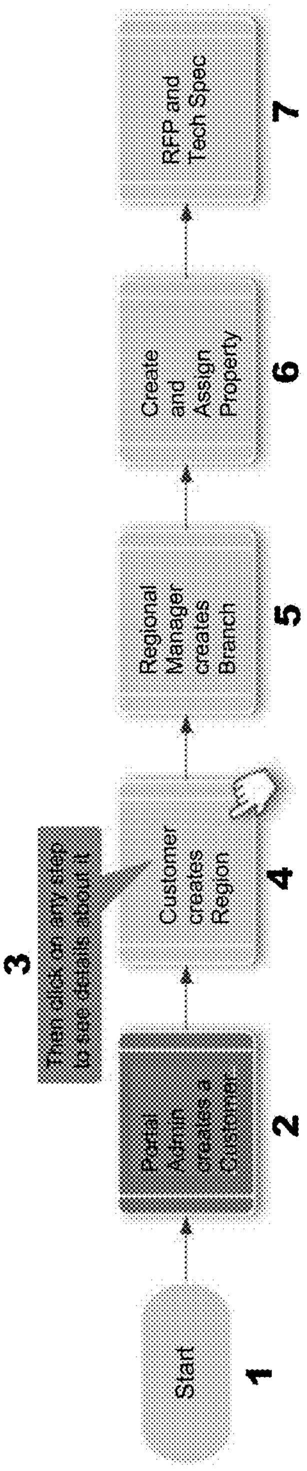
FIG. 1A-FIG. 1B.

While the present disclosure makes reference to specific exemplary embodiments, the present disclosure may also be embodied or implemented in other specific forms without departing from its spirit or essential characteristics. Accordingly, the disclosed embodiments are to be considered in all respects only as illustrative and not restrictive. For instance, various substitutions, alterations, and/or modifications of the inventive features described and/or illustrated herein, and additional applications of the principles described and/or illustrated herein, which would occur to one skilled in the relevant art and having possession of this disclosure, can be made to the described and/or illustrated embodiments without departing from the spirit and scope of the disclosure. Such substitutions, alterations, and/or modifications are to be considered within the scope of this disclosure.

The scope of the invention is indicated by the appended claims rather than by the foregoing description of the present disclosure. The limitations recited in the claims are to be interpreted broadly based on the language employed in the claims and not limited to specific examples described in the present disclosure, including the detailed description, which examples are to be construed as non-exclusive and non-exhaustive. All changes which come within the meaning and range of equivalency of the claims are to be embraced within their scope.

It will also be appreciated that various features of certain embodiments can be compatible with, combined with, included in, and/or incorporated into other embodiments of the present disclosure. For instance, systems, methods, and/or products according to certain embodiments of the present disclosure may include, incorporate, or otherwise comprise features described in other embodiments disclosed and/or described herein. Thus, disclosure of certain features relative to a specific embodiment of the present disclosure should not be construed as limiting application or inclusion of said features to the specific embodiment.

In addition, unless a feature is described as being required in a particular embodiment, features described in the various embodiments can be optional and may not be included in other embodiments of the present disclosure. Moreover, unless a feature is described as requiring another feature in combination therewith, any feature herein may be combined with any other feature of a same or different embodiment disclosed herein. It will be appreciated that while features may be optional in certain embodiments, when features are included in such embodiments, they can be required to have a specific configuration as described in the present disclosure.

Likewise, any steps recited in any method or process described herein and/or recited in the claims can be executed in any suitable order and are not necessarily limited to the order described and/or recited, unless otherwise stated (explicitly or implicitly). Such steps can, however, also be required to be performed in a specific order or any suitable order in certain embodiments of the present disclosure.

Furthermore, various well-known aspects of illustrative systems, methods, products, and the like are not described herein in particular detail in order to avoid obscuring aspects of the example embodiments. Such aspects are, however, also contemplated herein.

The following examples are not intended to be read to limit the scope and/or application of the present invention. They are provided for purposes of illustrating some embodiments of the systems and methods. Any variety of variations and substitutions may be made in the embodiments specifically described within the spirit and scope of the invention.

The modules below detail each step of the process as well as the lateral processes associated with the software.

EXAMPLE 1—PERFORMANCE MODULES

In some embodiments, the system comprises several performance/task specific electronic modules, that, when provided together in the presently described integrated service computerized tool, assist a customer/client in managing a subject property and delivery of supplier services. These modules include:

RFP module
Procurement module (bids, contract award)
Tracking (Contract compliance/monitoring) module
Consulting module
Asset management module
Water management module
Forecasting module Each of the modules will be described briefly in the following text.

Figure 1B:
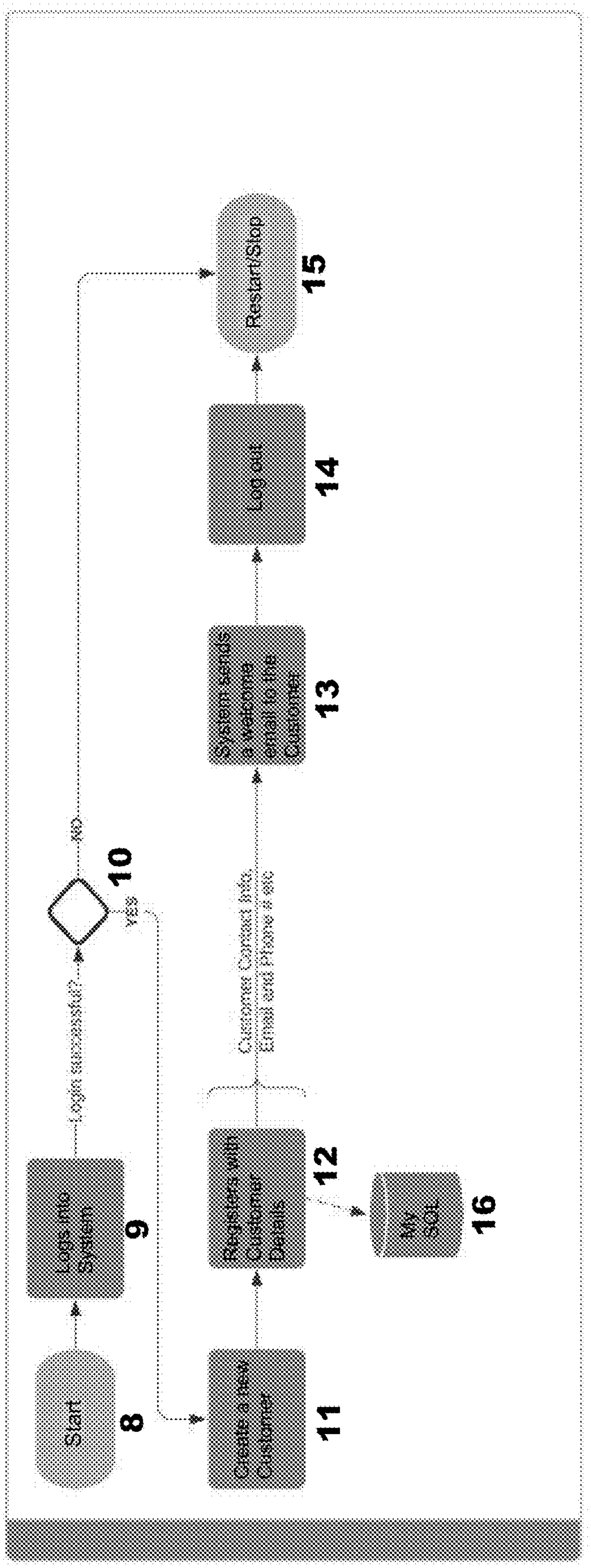
Figures 3A, 3B, 3C:
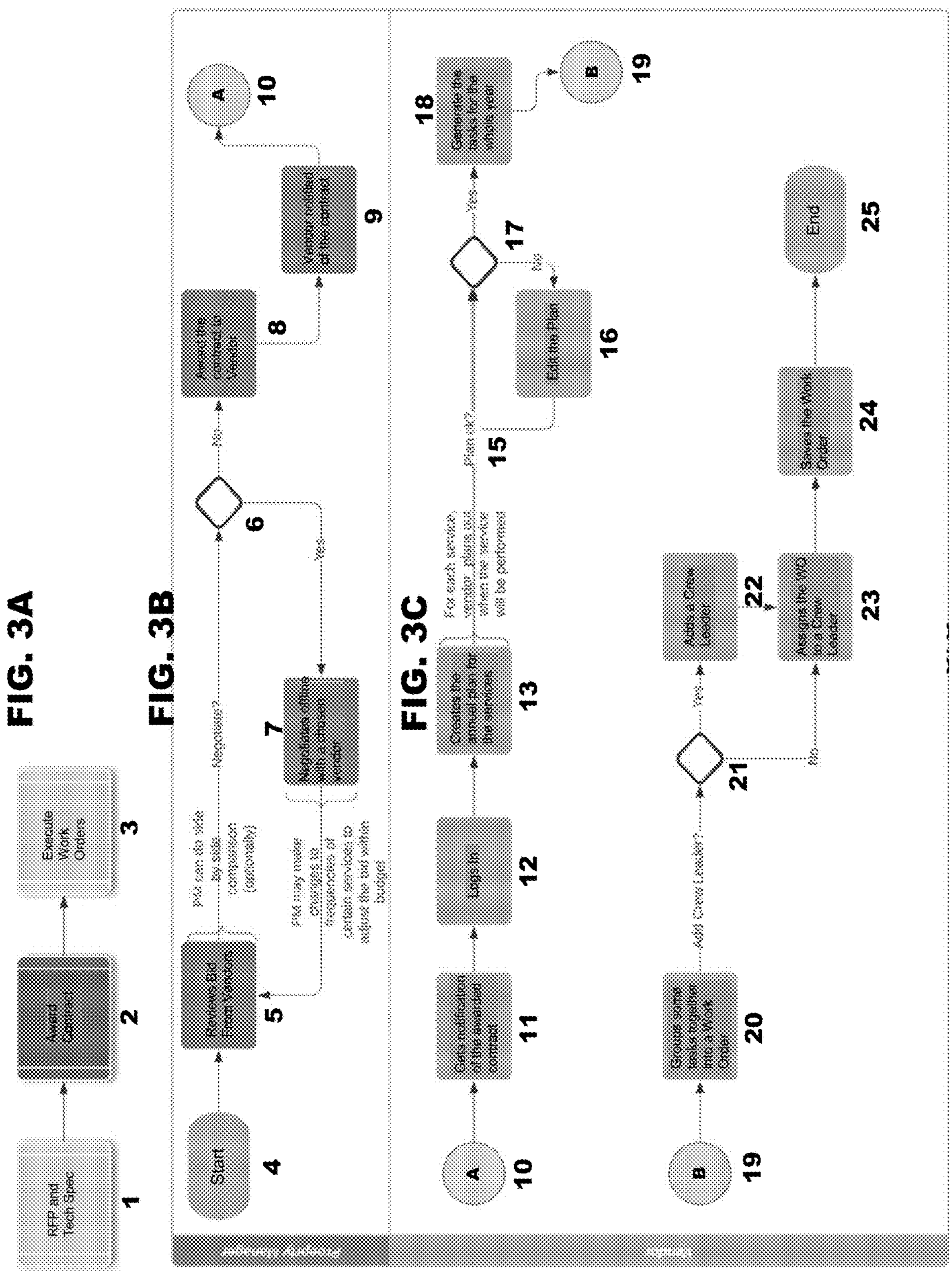
FIG. 3A-FIG. 3C.
Figure 4:
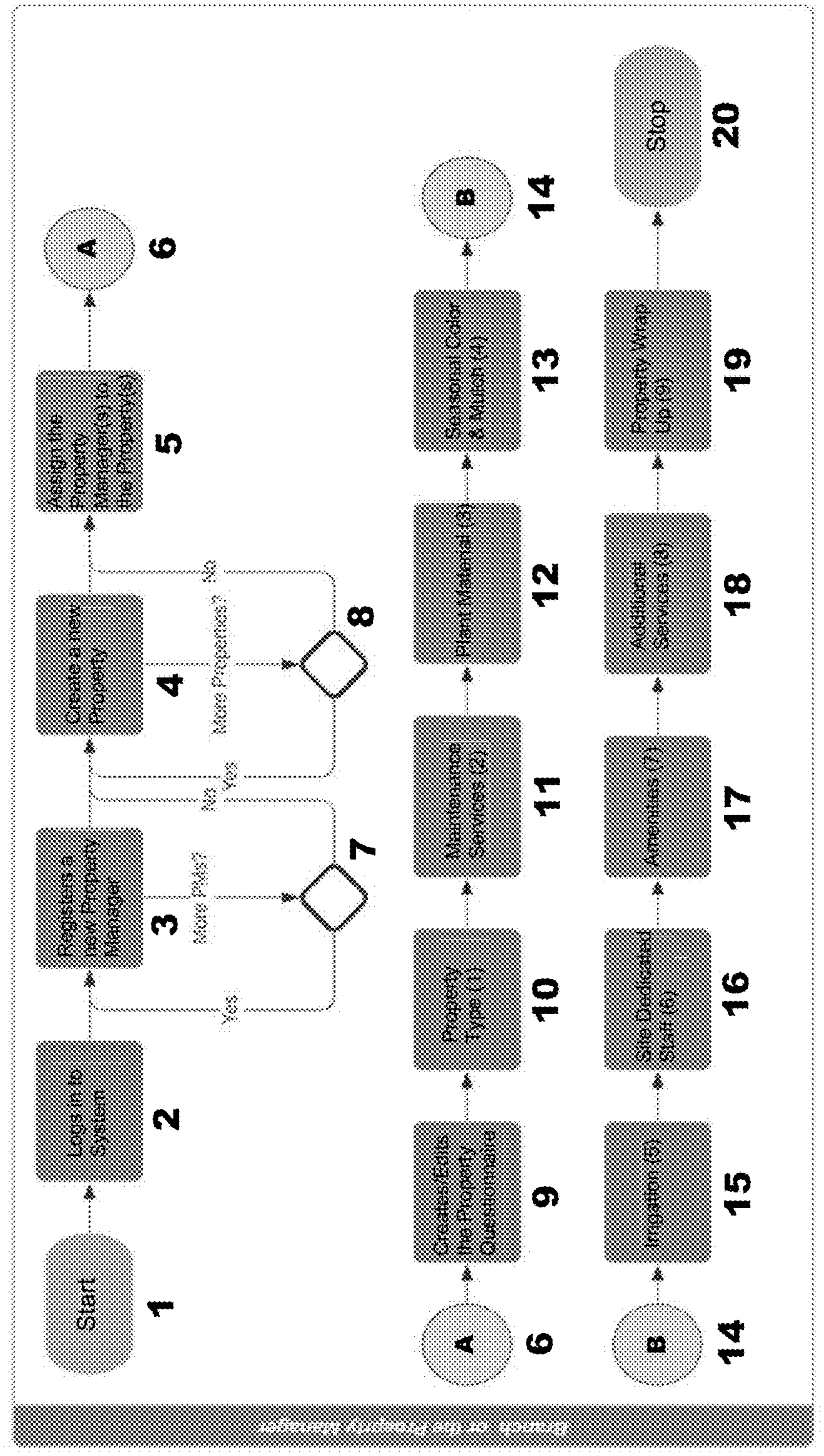
FIG. 4: (1) Start. (2) Logs into System. (3) Registers a new Property Manager. (4) Create a new Property. (5) Assign the Property Manager(s) to the Property(s). (6) A. (7) {More PMs? Yes/No}. (8) {More Properties? Yes/No}. (9) Creates/Edits the Property Questionnaire. (10) Property Type (1). (11) Maintenance Services (2). (12) Plant Material (3). (13) Seasonal Color & Mulch (4). (14) B. (15) Irrigation (5). (16) Site Dedicated Staff (6). (17) Amenities (7). (18) Additional Services (8). (19) Property Wrap Up (9). (20) Stop.
Figure 5A:
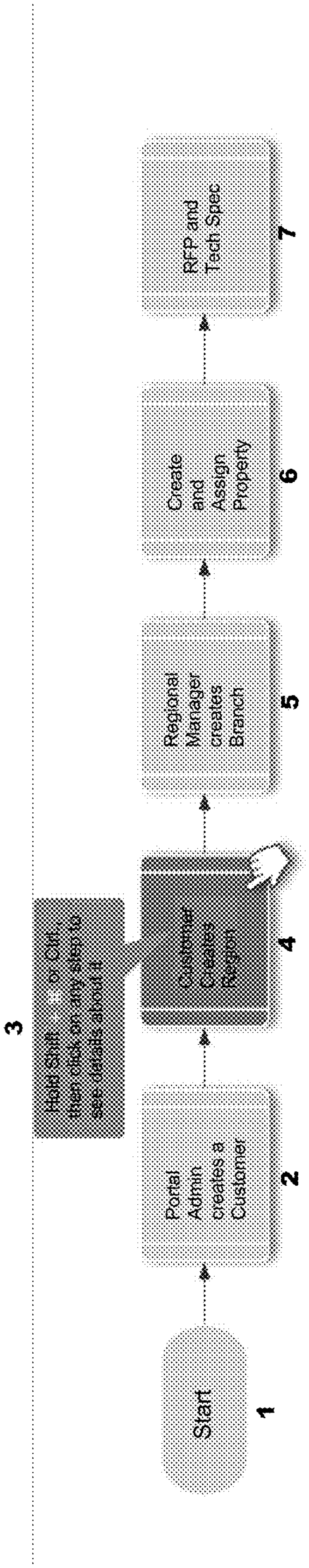
FIG. 5A-FIG. 5B.
Figure 5B:
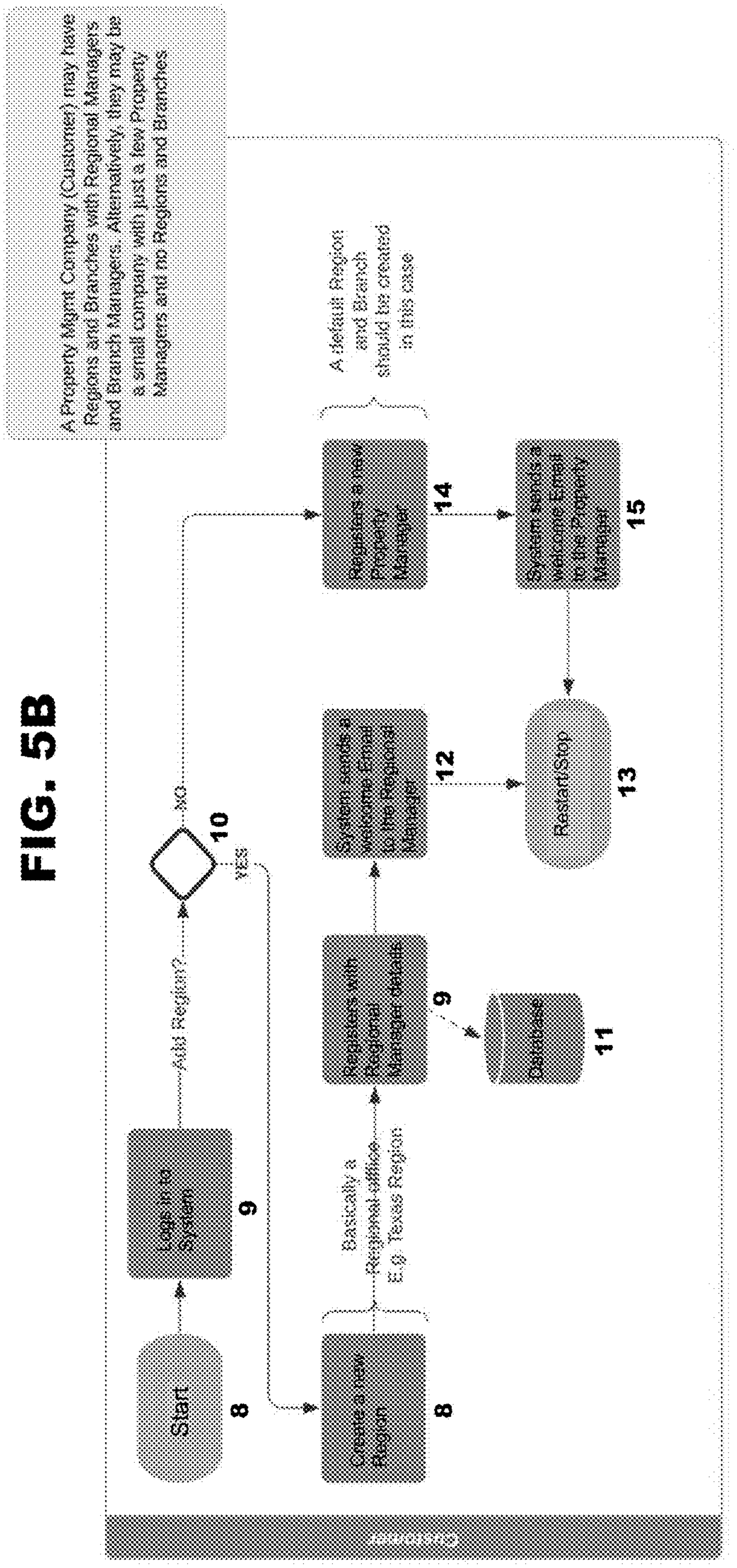
Figure 6A:
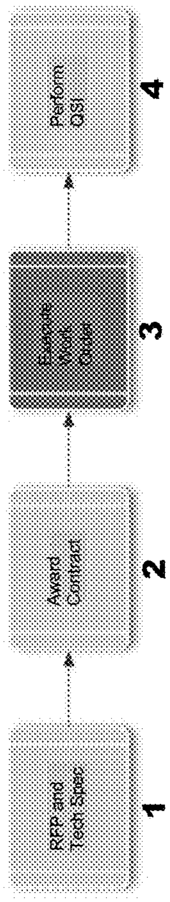
FIG. 6A-FIG. 6B.
Figure 6B:
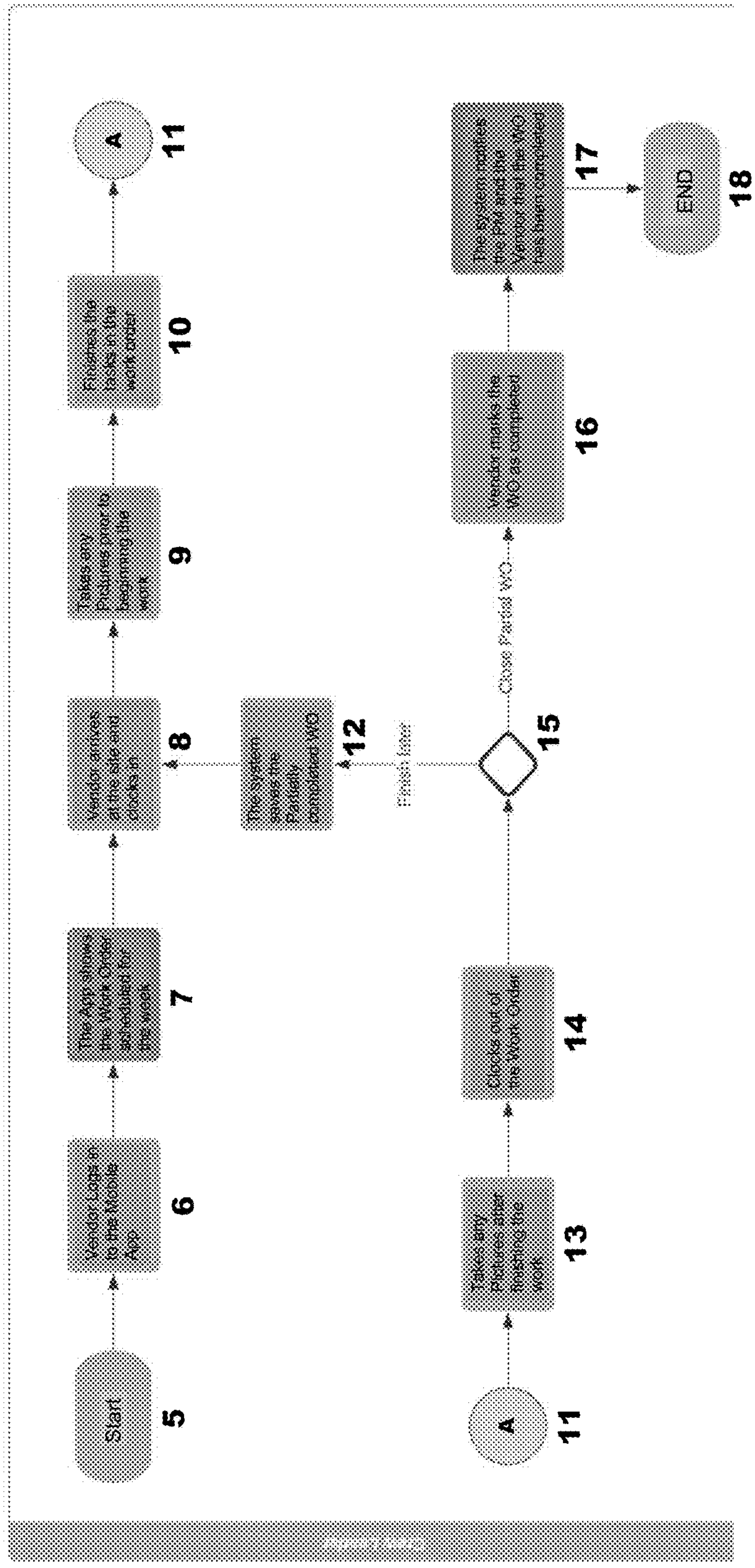
Figure 7A:
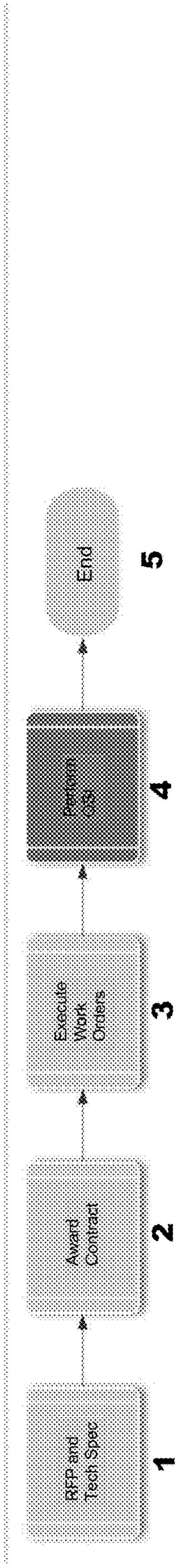
FIG. 7A-FIG. 7B.
Figure 7B:
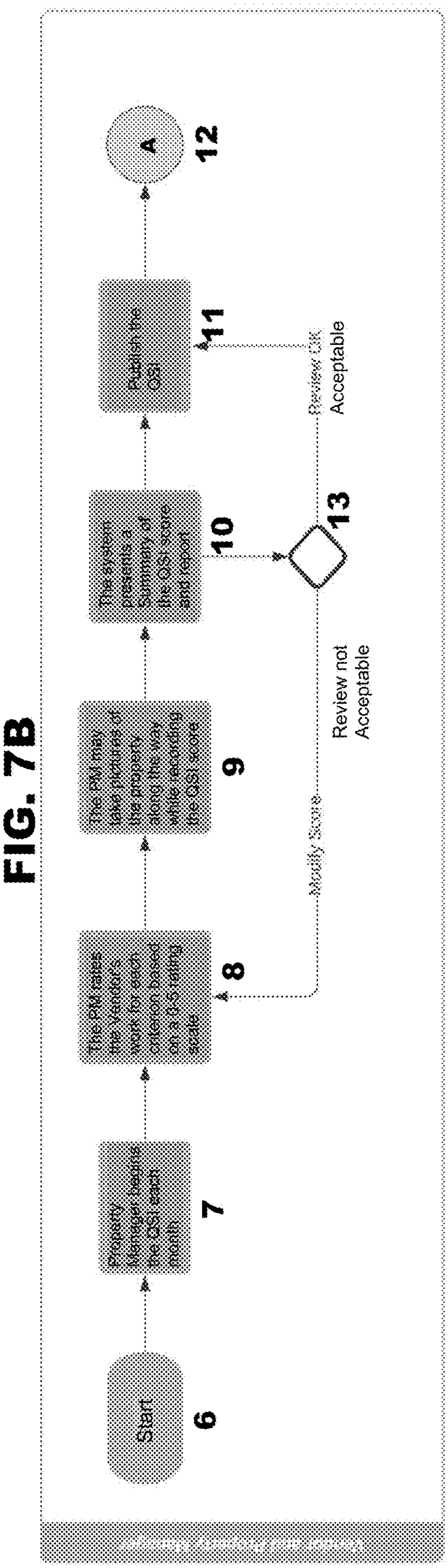
Figure 8A:
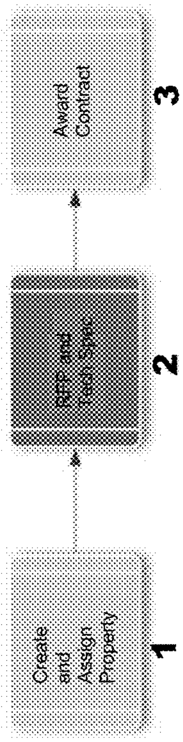
FIG. 8A-FIG. 8C.
Figure 8B:
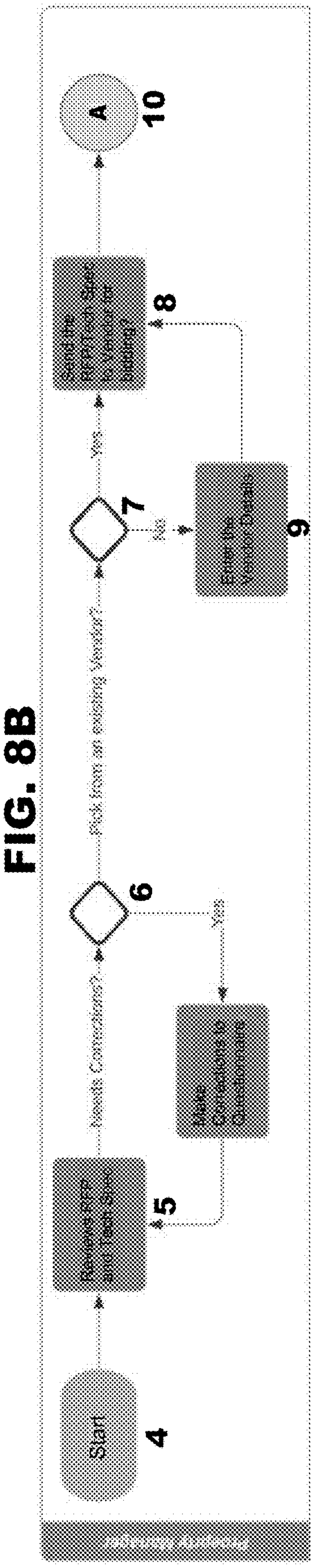
Figure 8C:
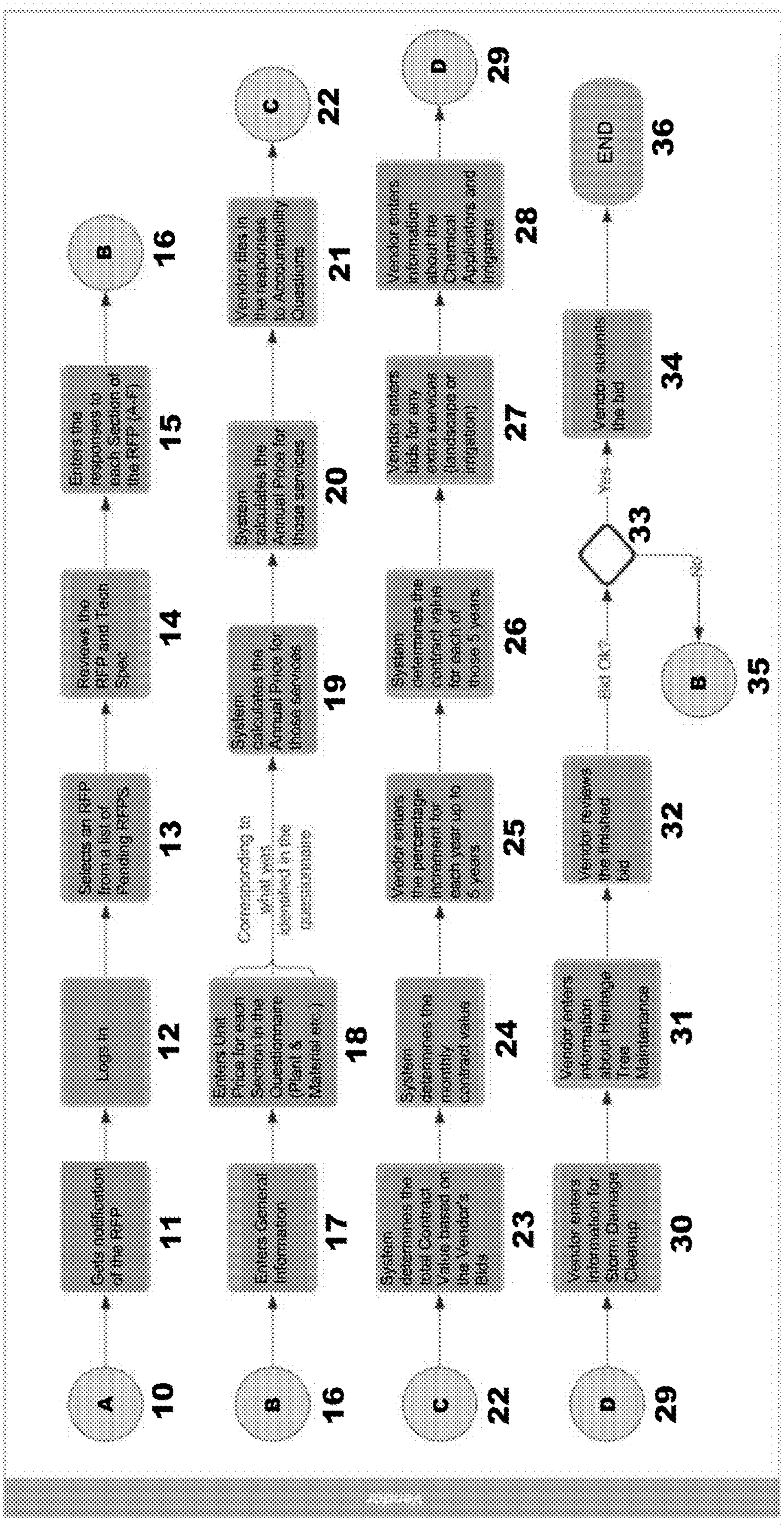

Procurement Module: The Procurement module may be employed in property management and services delivery, as generally depicted in FIG. 1. It is envisioned that this procurement module may be implemented in any variety of service contracts, recurring or project based, including janitorial services, porter services, facilities maintenance services, HVAC, plumbing, electrical, landscape maintenance, etc. to generate clear and professional contracts. The procurement module may include software that upon execution in a computer network, would generate a text document that includes terms that define basic terms of service and delivery in the form of a draft contract. The draft document would include, for example, general wording from an industry accepted mater service agreement, together with specific subject property project specifications (frequencies, etc.), to generate a draft response to a request for proposal (RFQ) placed by a consumer/property manager.

RFP Generator: A contract that addressed the uncertainty related to technical aspects of a specific subject property required by a consumer/client may be more efficiently achieved with the herein described RFP Generator (RFP module). Clients typically include procurement personnel, property managers, facilities managers, etc. that are educated/experienced in their related fields, but who may not be able to readily identify quality and reliable suppliers for servicing a subject property. The RFP Generator is designed to assist the consumer/client in matching the appropriate scope of services to the particular property needs of the subject property of the consumer/client.

In this module, answers to a series of simple questions are tabulated and used to generate an appropriate scope of work statement for the subject property site employing basic property information, client objectives, and importance of the various contract aspects. This consumer/client questionnaire is user friendly, and provides an efficient means to develop an appropriate request for proposal (RFP), to which a service provider may effectively respond.

For example, industrial sites in the upper Midwest, requiring lower quality, compliance type maintenance, with winter service should be very specific for their needs year-round, whereas a Class A corporate campus in Florida may require onsite personnel, year-round plant care, and no winter service may have a very robust and completely different of specifications to service it appropriately. Pre-formatted service templates specific to the market sector and area of the country would already exist within the software, but may be modified based on the client's answers. This module would serve as the foundation for the request for contract performance and compliance module to track service provider performance. Items of importance would include:

Property Information: This is basic property information that will be used for virtually everything from basic site address, billing information, and proper scope determination.

Site name
Site address
Ownership information
Property management company

- Client contact information
- Billing information
- Region (Climate, market expectations, preferred vendors, suggested plant material, local resources)
- Market segment (Corporate campus, retail, multi-family, HOA, etc.)
- Estimated size (acres)
- Current status from the clients' perspective (New, excellent, maintainable, needs improvement, fair, poor, nonexistent)

The answers to these questions help determine which contract templates to access, where to find local resources, determine common plant materials for the project location, assist in appropriate treatments, establish the groundwork for the water management, and aid in forecasting.

Client objectives: Examine each aspect of the landscape maintenance thoroughly:

- Routine landscape maintenance (Mowing, trimming, blowing, etc.)
- Water management/Irrigation/Pump services
- Agronomics (Pre/Post-emergent weed, insect, disease, ant control, fertilization, etc.)
- Mulch application
- Seasonal color installations
- Rye overseed
- Tree pruning
- Snow/Ice removal
- Inclement weather response
- Pond management
- Onsite personnel (Porters/Ambassadors)
- Sports field maintenance
- Specialized area maintenance (Artificial turf, dog parks, bocce ball courts, tennis courts, playgrounds, etc.)
- Ask simple questions to gain valuable information without wasting the client's time.
- Is the Property irrigated? Yes OR No (If NO, then move on to next aspect. If YES, more information is needed.)
- What percentage is irrigated?
- How many controllers are on site?
- Potable or non-potable sources?
- What is the desired outcome?
  - Water savings
  - Basic maintenance
  - Unsure
- Are basic repairs to be included? (Heads, nozzles, etc.)
- Determine the desired outcome and time frame?
- Save money
- Maintain status quo
- Improve by 25% in 1 year
- Significant improvement from current class in 3 years These answers help determine the desired level of maintenance and generate a scope that is appropriate for the property and client expectations. Instead of asking the customer to subjectively determine their level of service, the answers they provide will help objectively determine their current and desired level (Class A+, A, B, B−, Utility, etc.) of service.

Aspect importance: This information is used to build a scoring matrix for proposal evaluation and to later build a performance matrix for site quality.

- Rank each contract aspect and relevant landscape maintenance aspect to determine level of importance.
  - Aspects
    - Price
    - Safety
    - Quality (Turf, shrubs, irrigation, trees, mulch, seasonal color, general site cleanliness, etc.)
  - Level of importance (Very important, somewhat important, neither important or unimportant, unimportant, very unimportant)

Once the information is collected, the data obtained is used to create an in-depth landscape maintenance scope specific to that property. The landscape specifications will be approved by an expert in the relevant scientific discipline (such as a Ph.D. in Crop Science/horticulturalist) and implement the most current and accepted industry best practices.

- Plant materials will include all common insect and disease problems for each plant and recommended product control materials.
- Fertilizer requirements will be provided for common plant materials to the region. This will include product recommendations and frequency of application based on soil profile for the area.
- Herbicide requirements for plant material and hard surfaces will include product recommendations and frequency of application.
- Any necessary special machinery/circumstances added in the questionnaire process will be included in the specifications.
- The irrigation system information will provide the areas of operation that are the responsibility of the landscape contractor. Operation of the irrigation system, programming controllers, included repairs, proper watering procedures and regular inspection of the system will be included.

After the scope with task frequencies is generated, a formal pre-bid meeting and property walk may be held at the client's discretion for potential bidders/suppliers. Submissions would include unit pricing for each piece of the scope and annual pricing to help client's compare and determine what services and frequencies fit within their budgets. At the client's discretion, services may be removed from the contract and reallocated as an extra expense to be invoiced upon completion or excluded from the contract all together to fit within their requirements.

The module would also assist the procurement process, similar to other systems used in procurement processes, and allow for suppliers to ask questions, respond and submit their proposals electronically for evaluation.

Evaluator: The evaluator is used to easily and visually compare supplier responses based on a matrix. From the questionnaire process, the Aspect Information is used to assist in building the scoring matrix to later view responses objectively. This allows different clients to rank pricing, safety, action plans, value-added service, etc. in a manner that suits their needs to quickly identify the best suppliers for them. Suppliers that chose not to answer questions may be flagged or completely disqualified from the bid depending on how the client views the importance of those questions.

Upon award of the contract, suppliers would need to agree to the terms and conditions. Suppliers may also subscribe to the service after applying and being approved as preferred vendors to potentially be included in future bid opportunities. This helps clients quickly chose quality bidders rather than resorting to Google or Yellow Pages.

Tracking Module (Contract Compliance verification): The Tracking module is a GPS based tracking platform to log vendor performance against the contract specifications. Individual specifications are assigned completion dates or milestones to track progress and keep a running tally of services performed. Most contracts have certain frequencies built into them based on what is typical for a particular region whether it be 36 routine landscape maintenance visits, 3 pre-emergent applications, 3 fertilizations, 2 color changes, 1 mulch application, etc. This module allows the client to ensure they are getting what they are paying for. In reverse, the module also protects the supplier to ensure they are not over-servicing without appropriate compensation or at the bare minimum, documentation of the pro bono services.

Process Steps:

1. After award of a subject property management contract, the supplier sets a plan in place for all services throughout the entire year by week, (i.e. mowing is planned to start in week 9 and occur weekly through week 44; seasonal color will be installed in weeks 14, 24, and 41, etc.).
2. Within 30 days of the start of each service, the supplier will need to actually schedule the particular service(s) by creating a work order and assigning it to a crew, technician, etc.
3. The work order is instantaneously uploaded to the crew/technician's mobile device to be performed on the appropriate scheduled date.
4. On the day of service, upon arrival of the crew/technician at a defined location, the crew/technician may electronically "check-in" to the system through a defined, designated and secured internet web-access site, using his/her credentials/security access code/s, using a crew/technician electronic interface (such as an interface on a mobile device). Once the check-in process is verified and completed, the crew/technician will be able to electronically access a specific work order for a location, the work order outlining the services to be performed at a specific location (routine maintenance, chemical application, irrigation inspections, etc.). Once the specific work order is accessed by the crew/technician, the software system will generate notification of an event, and employ appropriate tracking software to track the date, time, GPS location, and other specific tasks to be completed by the crew/technician, such as documenting work performed with electronically time-stamped "before" and electronically time-stamped "after" photographs of the location.
5. Upon completion of service the crew/technician and/or supplier, will electronically "check" tasks complete/in-progress/did not perform, collect pictures of completed tasks and/or problems identified while on location, and adding any necessary notes or comments to close the event. (As technology continues to evolve, pictures are starting to be linked to the web in effort to self-recognize what is in the photos. This will aid in plant, weed, and disease identification.)
6. The time between check in and check-out is tracked against general industry/production standards to determine the possible quality of the service. The GPS tracking utilizes a geo-fence created around the location to ensure that the supplier is where they said they were at the time of check-in and check-out. A notification informs the client that a service has been performed to alleviate missed communication and act as a backup for the supplier.
7. Events are compiled in the database per account and tracked against the service agreement set-up from the awarded specifications at the end of the RFP process. This may also be used to track progress of a one-time project based on specific milestones.
8. The software populates information gathered from the database to display progress on a dashboard either by account, by property manager, portfolio, supplier, etc. to quickly highlight vendors and suppliers that are performing as agreed in green or nonconformance in red. The dashboard is also visible to the supplier for them to monitor their own progress and plan future activities or develop an action plan to catch up on missed tasks.

Clients and suppliers can open the events to view the pictures and report once the job has been completed. Information such as check-in, check-out times are also visible to verify they have met standards of the service agreement. This platform allows property and facility managers to supervise a much larger portfolio of business by forcing the suppliers to manage themselves in a transparent environment.

The software system would tie directly into the accounts payable system so that if a vendor has not met their contractual agreements for that month or invoice period, the vendor may be penalized in the form of short payments. Short payments may result as a result of a crew/technician/supplier failing to deliver as contracted. An overriding protocol is provided in the present systems and methods to protect the integrity of the short payments. The protocol requires a 2-person hierarchy approval process (persons above the property manager) and requires that the short-payment be documented with and/or logged into a purchasing department. This protocol serves to protect the integrity of the accounting function, and as an added feature between the parties that avoids any appearance of a conflict of interest. Should a set number of nonconformance periods occur during the course of a contract, either in sequence and/or in total of the service period, a red flag alert is provided to be generated within the system. A performance improvement plan (PIP) may then be electronically generated and provided to the non-compliant service provider, and an official Notice of contract noncompliance provided to that service provider. This Notice may also serve as basis for termination of the contract with the service provider.

This present systems and/or methods are not intended to remove or reduce a property manager's duties and responsibilities for examining the quality of service and performance compliance of a service provider/contractor. The systems and/or methods provide an additional tool to the parties for more easily and accurately documenting the identity and performance contract compliance of a vendor/service provider delivering goods and/or services, and alerting the customer of those vendor/service providers that are failing to provide satisfactory services and/or that are in breach of the service terms of a contract. In addition, it is envisioned that the systems and/or methods may also be useful to service provider/contractor management, permitting them to take corrective action where lack of performance by its employees and/or vendors is identified. The opportunity to proactively correct a situation is therefore created, thus possibly avoiding the loss of a consumer and/or property owner contract. The systems and/or methods are also useful in providing objective criteria for establishing credibility and performance quality and reliability for a specific supplier, in the event a supplier change or termination of a supplier is being contemplated.

It is envisioned that the present methods and systems provide multiple segments for management companies to subscribe to, depending on their specific portfolio needs:

Landscape maintenance
Janitorial
Porter service
Pool maintenance
Pond and fountain maintenance
HVAC preventative maintenance
One-time projects New construction
Etc.

Each segment will be carefully set-up for the specific industry sector to ensure best practices and highest quality with the least amount of waste.

Advantages: The systems and methods disclosed herein have may advantages to a property owner, manager, or other property professional staff personnel. Some of these advantages include the following.

Turnover management: It is envisioned that the present methods and/or systems will reduce the incidence of management and employee turnover. Clients and suppliers undergo turnover with some degree of unacceptable frequency. Management companies and suppliers encourage employee growth and larger portfolios to maintain a healthy business. Internal promotion often creates a void in leadership and/or available mid-level staffing, leading to an unproductive transition period for acquiring a replacement property or account manager. Loss of employees for other reasons creates a large gap of lost institutional knowledge and information. The present systems and/or methods provide for the storing and preservation of corporate institutional knowledge and information about subject properties and individual vendors/service providers, including a readily accessible database of vendor/supplier contract information. In this manner, changes of personnel, management company or supplier are virtually seamless because data/information is being continuously monitored and documented by an automated system, rather than a person.

Accountability: Through the property life cycle suppliers and management companies have a tendency to change from time to time. Information is often unclear and difficult for a new management company to understand why a particular property has fallen to a lower quality of appearance, despite supplier performance according to contract metrics. Inaccurate scope metrics, relative client financial stability, and inadequate/inconsistent management are all contributing factors to unsatisfactory product quality, and oftentimes results in a supplier's wrongful termination. The present methods and/or systems are designed to provide a more objective system that holds each party responsible and accountable for their part of the agreement. In addition, information is stored and tabulated to permit objective corporate decisions and vendor/contractor determinations, reducing and/or eliminating subjective bias in the decision process.

Fairness: Some suppliers elicit business interest through a low initial property maintenance price, and proceed to charge numerous incremental additional charges afterward for any requested service once the agreement is signed. This practice engenders lack of trust and destroys creation of a collaborative partnership in property management. Clients on occasion may also inappropriately impose that vendors/service providers provide out-of-scope materials and services free of charge to the client, by leveraging a grant of large property award contracts in return. This dynamic also destroys the development of a collaborative partnership relationship in property management. The present systems and/or methods remedies these and other points of dissension by providing for the creation of an agreed upon budget and pricing scale, as well as a defined scope of services, between the parties before a contract is awarded.

CONSULTING MODULE: The system gives managers the tools to supervise a supplier's contract obligations objectively from a business standpoint, but what about the technical knowledge and science involved in maintaining first-class landscapes? Most property/facility managers do not possess knowledge in horticulture, arboriculture, soil science, etc., which means they need assistance filling this void for a specific landscape location. Typically their landscape maintenance supplier should be able to provide all the resources they need. However, this remains many times unverifiable.

The Consulting module can be used in a couple of ways, depending on a customer's needs. Some customers may prefer a guided approach for their consultation services through an online portal/app with remote assistance, while others may need a more hands-on approach by a consultant physically on location at set intervals. Either avenue involves a Quality Site Inspection to objectively evaluate the property at each visit and use pictures to identify, assess, and provide feedback. This gives all parties the documentation to compare the property to itself from month to month, season to season, and year to year.

The following Table presents a Quality Site Inspection term sheet that may be used as part of the presently described methods and systems.

WATER MANAGEMENT MODULE: The amount of water required to maintain a particular landscape in the condition and having the appearance preferred by an owner/manager, while providing a watering schedule/regimen that optimizes the best efficiency of water usage, are important factors for effective and cost conscious property development and maintenance. Water is an increasingly valuable resource, and most properties, based on plant material, require a specified amount of water each year to survive. Likewise, many geographical regions receive more or not enough of the rainfall necessary for maintaining a particular desired landscape, based in part on the variations between the differing climate among regions. The Water Management module provides a tool for providing an efficient and customized water distributing system for a landscape that is developed using the specific base property measurement, the onsite plant material, and the typical climate of the geographical region. This tool permits the calculation of the amount of water needed for successfully and efficiently maintaining a landscaped property over a one year period. Clients and suppliers can use this information to understand if they are watering appropriately for their properties, and measures that may be taken to improve existing watering system practices.

This Water Management Module consists of the following resources:

Online
- Inspection forms for suppliers to submit reports to clients
- Basic scheduling recommendations to irrigate more efficiently rather than the old 15 minutes for sprays, 45 minutes for rotors and 60 minutes for drip that ultimately waste water
- Recommended seasonal adjustments based on most accurate weather data Onsite (Additional Fees)
- Perform a complete system inspection to determine operating capacity
- Complete a water audit to determine efficiency
- Provide system and scheduling recommendations to irrigate smarter and conserve more
- Provide advice to solve recurring issues and areas of concern FORECASTING MODULE: Commercial industries operate on budgets to control spending and ensure profitability. This is an essential function of business, but it is often hard to illustrate the actual needs of a property or facility. The Forecasting module uses inputs at the start of a contracted service to develop a baseline of needs for the property.

For the green industry, irrigation repairs is one of the major expense items that is often overlooked or mis-budgeted. This inevitably puts strain and stress on property and facility managers to keep their landscape assets alive and sustainable without breaking the bank. Using industry standards of productivity and labor expense, coupled with the expected useable life of components, type and quantity of zones on a property, and system age, we can calculate an irrigation repair budget of repairs that will be needed year over year due to basic wear and tear.

Similar equations can be used to determine expenses for tree pruning, enhancements, upgrades, mulch, seasonal color, and even water usage from irrigation. This type of thinking allows for not only short-term forecasting, but it gives asset managers the power to look into the long-term forecasting 3, 5, and 10 years down the road and look at their properties with a proactive approach.

Online: Internet Website Implementation; Electronic Application (App):

An automated internet based system provides the user with a tool that may be employed as a digitally based Consulting Module. The digital tools provided within the Consulting module provide a more cost effective avenue for properties that may not have the budget for an on-site consultation. The Online option provides the following services to the user:

- Assistance evaluating bid submissions
- Assistance to adjust contract to meet budget constraints
- Access to a master plant material library of approved plant material complete with pictures, strengths and weaknesses, common maintenance practices, common insect and diseases per plant with recommended treatments, possible growth regulators, etc.
- Soil testing resources in their region for more accurate product application regarding fertilizers and soil amendments
- Guide of landscape maintenance best practices and procedures
- Additional online consulting support by a qualified horticultural consultant (2 horticultural related questions, 2 contract related questions per month)
- Maintenance alerts will appear on the dashboard throughout the month when potential problems with insect infestations, freezing conditions expected, and other conditions that may put plant material and property assets at risk. (i.e., grubworm infestations, making sure plants have been watered going into freeze and shutting down irrigation systems, no pruning live oak trees and due spread of oak wilt disease, changing recommended mowing heights, irrigation adjustments for systems that do not have smart controllers, etc.)

Onsite (Additional Fees)

Customers with larger budgets and complex properties typically gain greater value from an actual onsite inspection biweekly, monthly, quarterly, etc. This would involve having a credentialed third party consultant visit and walk the property, examining and grading the site while also providing valuable feedback and advice. Additional fees would apply to this service depending on travel involved and time spent on location. Each consultation will include a written, photographic report provided to the Property Manager. Onsite consultations would include but not be limited to:

- Identifying continuing landscape problems that have not been solved through regular maintenance
- Advising plant material selection for new project areas
- Reviewing current landscape maintenance and identifying areas of concern and improvement
- Complete irrigation system evaluation and provide recommendations
- Storm damage evaluation and loss estimation Eventually this service could be made more affordable by partnering with local universities, extensions services, and other local horticultural consultants to identify problems, provide feedback, and even perform onsite consultations once they have been approved by management.

Electronic Application Development: The Consulting Service may optionally be coupled with a mobile device, a camera, or other device similar to a computer implemented, internet based application ("app"), on the user's personal hand held device (iPhone, iPad, etc.). The image recordation feature may be used to document important characteristics of a particular landscape, including by way of example:

- Plant identification
- Weed identification
- Disease identification
- Etc.

ASSET MANAGEMENT MODULE: Properties are full of valuable assets. Items like trees and irrigation systems carry heavy price tags to maintain and even greater cost to replace. A single, sustainable 12-inch caliper tree on property is valued at more than $10,000. How many do you have on your property? Where are they? What level of health are they? What treatments have they received over their lifespan? Common irrigation backflow devices cost anywhere from $1,500 to $10,000 to replace. How many are on your site? Where are they if you need to turn them off? Who has this information? Thousands of gallons of water may be lost while attempting to locate and gain control if a break were to occur.

The Asset Management module give clients and suppliers the power to acquire and store their asset information in a single, easily accessible location. This knowledge gives them the control to know what their assets are, where they are, place them on a preventative maintenance schedule, and track their history.

Assets:

- Trees
- Square footage of plant material (turf, shrubs, perennials, groundcover, native area, seasonal color, etc.)
- Water sources
- Irrigation controllers
- Backflow devices
- Pump systems
- Irrigation zone maps
- Testing sites
- Landscape accessories (Benches, waste containers, etc.)
- Etc.

The Asset Management module utilizes GPS location and QR tags to locate the asset and link it to the system data.

What is claimed is:

1. A property management system for a subject property, comprising:

a centralized computer having a receiver interface, said receiver interface having a server database comprising a baseline dataset, wherein a customer service report is generated by the centralized computer and electronically transmitted to a customer/consumer interface;

a device at the subject property comprising the customer/consumer interface for customer/consumer access to data for a geospatially verified subject property, wherein said customer/consumer interface has internet access and is in electronic communication with the centralized computer, wherein the device collects and transmits subject property data to the centralized computer, and wherein validation of services/materials is provided at the subject property is input by the service provider at a service provider interface to be and is transmitted to the centralized computer;

wherein the subject property data comprises moisture level, temperature, light/dark schedule, and photographic images of topographical condition at the subject property, and wherein the customer service report generated by the centralized computer is transmitted to and displayed at the customer/consumer interface.

2. The property management system of claim 1 wherein the customer/consumer interface provides for entry of data for a subject property landscape project and transmission of said data to the centralized computer.

3. The property management system of claim 1 wherein a contractor/service provider interface enables a contractor to receive data from the contractor/service provider and permits the contractor/service provider to generate and transmit a cost bid for a subject property service project to the contractor.

4. The property management system of claim 1 further comprising a data synthesizer that combines the baseline dataset with a local dataset to create a set of synthesized datasets, each of the synthesized datasets identified with a specific geographical region associated with the subject property.

5. The property management system of claim 4 further comprising a report generating means to electronically generate a performance report for the consumer/customer identifying performance metrics compliance by a landscape service provider for the subject property.

6. The property management system of claim 1 comprising geospatially identifiable site location enabled function specific performance modules, said modules comprising:

a request for proposal (RFP) module;

a procurement module;

a tracking (task performance/delivery) module;

a consulting module;

a forecasting module, a water management module; and an asset management module.

7. A property management method providing a service report of tasks performed on a subject property, executed by an interactive software user tool electronically downloaded onto an electronic device, the method comprising:

generating, by a centralized computer receiver interface having a server database comprising a baseline dataset, a customer service report and electronically transmitting the customer service report to the electronic device comprising a customer/consumer interface;

accessing, by the electronic device customer/consumer interface located at the subject property comprising, data for a geospatially verified subject property, wherein said customer/consumer interface has internet access and is in electronic communication with the centralized computer, wherein the electronic device collects and transmits subject property data to the centralized computer, and wherein validation of services/materials is provided at the subject property is input by the service provider at a service provider interface and is transmitted to the centralized computer;

wherein the subject property data comprises moisture level, temperature, light/dark schedule, and photographic images of topographical condition at the subject property, and wherein the customer service report generated by the centralized computer is transmitted to and displayed at the customer/consumer interface, and wherein the customer service report comprises services completed and/or to be provided and materials used and/or to be provided, entered by the service provider on the service provider device interface.

8. The property management method of claim 7 wherein the customer/consumer interface provides for entry of data for a subject property landscape project and transmission of said data to the centralized computer.

9. The property management method of claim 7 wherein the contractor/service provider interface enables a contractor to receive data from a contractor/service provider receiver and permits the contractor/service provider to generate and transmit a cost bid for a subject property service project to the contractor.

10. The property management method of claim 7 further comprising a data synthesizer that combines the baseline dataset with a local dataset to create a set of synthesized datasets, each of the synthesized datasets identified with a specific geographical region associated with the subject property.

11. The property management method of claim 10 further comprising a report generating means to electronically generate a performance report for the consumer/customer identifying performance metrics compliance by the landscape service provider for the subject property.

12. The property management method of claim 7 comprising geospatially identifiable site location enabled function-specific performance modules, said modules comprising: a request for proposal (RFP) module; a procurement module; a tracking (task performance/delivery) module; a consulting module; a forecasting module, a water management module; and an asset management module.

13. A property management method providing a service report of tasks performed on a subject property, executed by an interactive software user tool electronically downloaded onto an electronic device, the method comprising:

generating, by a centralized computer receiver interface having a server database comprising a baseline dataset, a customer service report and electronically transmitting the customer service report to the electronic device comprising a customer/consumer interface;

accessing, by the electronic device customer/consumer interface located at the subject property comprising, data for a geospatially verified subject property, wherein said customer/consumer interface has internet access and is in electronic communication with the centralized computer, wherein the electronic device collects and transmits subject property data to the centralized computer, and wherein validation of services and/or materials is provided at the subject property is input by a contractor/service provider at a contractor/service provider interface and is transmitted to the centralized computer;

wherein the subject property data comprises moisture level, temperature, light/dark schedule, and photographic images of topographical condition at the subject property, wherein the contractor/service provider interface enables a contractor to receive data from a contractor/service provider receiver and permits the contractor/service provider to generate and transmit a service and/or materials cost bid for the subject property to the contractor;

wherein the customer service report includes services completed and/or to be provided, and materials used and/or to be provided, by the service provider, wherein said method comprises an interface for the service provider to directly input a description of services completed and/or to be provided and materials used and/or to be provided, at the geospatially verified subject property, and wherein the customer service report generated by the centralized computer is transmitted to and displayed at the customer/consumer interface.

14. The property management method of claim 13 wherein the customer/consumer interface provides for entry of data for a subject property landscape project and transmission of said data to the centralized computer.

15. The property management method of claim 13 wherein the contractor/service provider interface enables a contractor to receive data from a contractor/service provider receiver and permits the contractor/service provider to generate and transmit a cost bid for a subject property service project to the contractor.

16. The property management method of claim 13 further comprising a data synthesizer that combines the baseline dataset with a local dataset to create a set of synthesized datasets, each of the synthesized datasets identified with a specific geographical region associated with the subject property.

17. The property management method of claim 16 further comprising a report generating means to electronically generate a performance report for the consumer/customer identifying performance metrics compliance by the landscape service provider for the subject property.

18. The property management method of claim 13 comprising geospatially identifiable site location enabled function-specific performance modules, said modules comprising: a request for proposal (RFP) module; a procurement module; a tracking (task performance/delivery) module; a consulting module; a forecasting module, a water management module; and an asset management module.

* * * * *